United States Patent [19]
Hergenrother

[11] 3,796,908
[45] Mar. 12, 1974

[54] ELECTROOPTICAL CORRELATOR TUBE HAVING A REAR TARGET MESH ELECTRODE

[75] Inventor: Rudolf C. Hergenrother, West Newton, Mass.

[73] Assignee: Raytheon Company, Lexington, Mass.

[22] Filed: July 22, 1968

[21] Appl. No.: 746,505

[52] U.S. Cl. ................ 315/11, 324/77 K, 315/12
[51] Int. Cl. ............................................. H01j 31/48
[58] Field of Search ....... 315/10, 11, 12; 343/100.7; 324/77 I, 77 G, 77 K

[56] References Cited
UNITED STATES PATENTS

| | | | |
|---|---|---|---|
| 3,474,286 | 10/1969 | Hergenrother | 315/11 |
| 3,728,577 | 4/1973 | Osepchuk | 315/11 |
| 3,189,781 | 6/1965 | Lempert | 315/11 |
| 3,423,624 | 1/1969 | Steiner | 315/11 |
| 3,424,937 | 1/1969 | Steiner | 315/10 |

Primary Examiner—Carl D. Quarforth
Assistant Examiner—P. A. Nelson
Attorney, Agent, or Firm—Harold A. Murphy; Joseph D. Pannone; Edgar O. Rost

[57] ABSTRACT

An electron discharge device of the image orthicon type having a storage target member and adjacent target mesh electrode provided with a substantially similar mesh electrode on the opposing side of the storage target member within the readout and signal multiplier section. For operation in an electrooptical correlation mode signal modulation voltages superimposed on either the target mesh electrode or rear target mesh electrode potentials will effectively control the induced charge distribuion on the storage target member produced by secondary electron emission. An electrooptical correlation system having two imputs to result in a single correlated output signal will result utilizing the present invention.

7 Claims, 5 Drawing Figures

INVENTOR
RUDOLF C. HERGENROTHER
BY
ATTORNEY

ELECTROOPTICAL CORRELATOR TUBE HAVING A REAR TARGET MESH ELECTRODE

BACKGROUND OF THE INVENTION

In the electronic communications art the employment of electrooptical techniques in the processing of information signals results in a mixture of input signals from which are extracted only those output signals which correspond to a chosen time sequence pattern with the remaining signals being suppressed. The single pattern with the remaining signals being suppressed. The single output comprises the correlated signal which has been sorted out of the input mixture. Electrooptical devices, particularly such devices employing cross correlation techniques, are desirable in the processing of information to obtain higher resolution in target definition and location in radar systems. For the purposes of this description the term "cross correlation" shall be interpreted to refer to the multiplication of two functions in the processing of intelligence signals plus the integration and readout by electrical means of the signal waveforms. The area of application of embodiments of the present invention resides in aerial reconnaisance and mapping utilizing radio frequency energy.

In the devices under consideration electrical signals are converted by elastic waves within a solid birefringent material to result in one input providing an optical image which is time varying. In the cross correlation concept these signals are electrically multiplied by a second electrical signal which provides a replica of the transmitted signal and the result product is time integrated. In the output part of the electrooptical correlator system a device which can perform the correlation process of multiplication and integration is required. A conversion device of interest is the image orthicon tube having a photocathode within an evacuated envelope for converting an incident optical image into an electrical discharge image by means of emission of primary photoelectrons together with modulation of secondary electrons emitted by impinging photoelectrons. An electron lens system processes these signals as a charge pattern on an insulating storage target member having a secondary electron emission ratio of unity or higher. An electron gun and deflection system provides for periodically reading out in a TV raster fashion the charge pattern on the insulated storage target member with the output signals recorded or displayed on a monitor tube. The main structure and function which is difficult to provide in the standard image orthicon tube is the means for introducing a second input electrical signal for the correlation operation.

Prior art attempts to modulate the storage target charging process through the introduction of the signal mixture in performing the integration function has resulted in operation of this member at or near its critical voltage or "first crossover operating mode." Operation at this critical voltage is unstable and attempts in this area have therefore been relatively unsuccessful. Operation at voltages considerably higher than the critical voltage results in the accumulation of positive charges from uncorrelated signals which drastically reduces the usable dynamic range and requires a periodic discharging cycle. In addition, modulation of the electron beam velocity produces drastic disturbances in the electron optical system focus.

In a copending United States application by Rudolf C. Hergenrother, Ser. No. 695,433, filed Jan. 3, 1968, and assigned to the assignee of the present invention, a means for modulation of the storage target charging process comprises an electrically biased mesh electrode member positioned parallel to the photocathode.

The second electrical correlation input signal is applied to this mesh member to modulate the photoelectron emission. In this operation mode the same voltages are applied as would be used in the operation of the image orthicon device as a television camera tube. As a consequence, there is a continual buildup of charge on the storage target member during the writing cycle and where a correlated signal input is involved the buildup rate would be greater. Consequently, a large DC signal in the output read signal has seriously limited the dynamic range. It is therefore necessary to cancel out the DC charging effect on correlated signals by operating the reading gun at a controlled low voltage of charging during the writing operation.

In an attempt to improve the desired integration process utilizing accumulation of a charge through secondary emission another suggested solution is outlined in copending United States application by Rudolf C. Hergenrother and John W. Lotus, Ser. No. 722,052, filed Apr. 17, 1968, and assigned to the assignee of the present invention. In accordance with this disclosure a planar barrier mesh electrode member is disposed adjacent to and parallel with the target mesh member in the electron image section. The barrier mesh member is biased at a potential such that the charging effect of the photocurrent on the storage target member is zero. When a positive or negative modulation signal voltage is applied to the biased barrier mesh member relative to the target mesh the secondary electrons produced by the storage target member charge correspondingly. As a result the desired charge process on the storage target member will materialize.

In the signal processing for electrooptical correlation systems still another solution for improvement of the insulated storage target member charging process utilizing image orthicon type tubes will be considered in the present invention.

SUMMARY OF THE INVENTION

In accordance with the teachings of the present invention an image orthicon device is provided having a target mesh electrode member adjacent to and parallel with the storage target member in the electron image section. Additionally, a mesh electrode member is disposed closely adjacent to the opposite side of the storage target member relative to the target mesh electrode. This additional mesh electrode member has the same spacing and composition as the conventional image orthicon target mesh electrode. With this arrangement an input correlation signal voltage can now be applied to either the target mesh electrode member or rear target mesh member. The new mesh electrode member provides for the substantial equalization of the capacitances between the opposing sides of the stroage target member and the respective mesh electrodes. By means of the additional mesh electrode member of the readout side of the overall device a serious problem has been satisfactorily solved in the provision of an operational electrooptical correlator tube with the target potential being modulated by induction from this mesh to one-half of the applied input signal voltage swing.

BRIEF DESCRIPTION OF THE DRAWINGS

The invention, as well as the specific details of the construction of an illustrative embodiment, will now be described, reference being directed to the accompanying drawings in which.

DESCRIPTION OF THE PREFERRED EMBODIMENT

Figure 1:
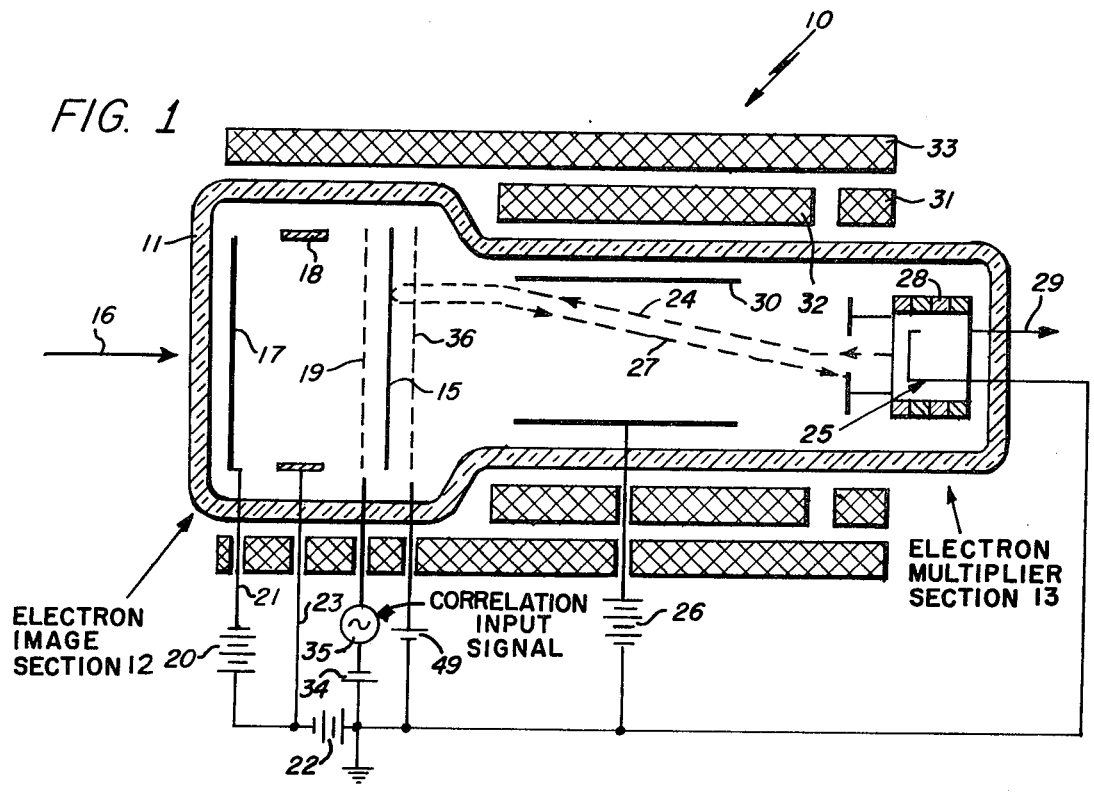
FIG. 1 is a schematic diagram of the illustrative embodiment of the invention.

Referring to the drawings, FIG. 1 illustrates a device 10 of the image orthicon type. A transparent envelope 11 houses a first section designated as the electron image section 12 at one end followed by the electron multiplier and readout section 13 disposed at the other end. The electron image section 12 includes an insulated storage target member 15 which may be of a semiconductive dielectric material coated with a material having a secondary electron emission ratio substantially higher than unity. Light rays emanating from a direction indicated by the arrow 16 impinge upon the semitransparent photocathode 17 to emit photoelectrons. These electrons are guided by a magnetic focusing field, to be hereinafter described, to impinge upon the storage target member 15 resulting in the generation of secondary electrons. An annular ring electrode 18 in combination with the magnetic field producing means is utilized to focus the photoelectrons leaving a point on the photocathode 17 to a corresponding point on the storage target member 15. A fine target mesh electrode 19 is disposed in front of the storage target member 15 to collect the secondary electrons released by the target member. A charge is thus stored on the storage target member surface which may become a few volts more positive than the target mesh in the areas receiving electrons from strongly illuminated areas of the photocathode. The photocathode is conventionally biased at a high negative voltage by a voltage supply 20 through lead 21 while the focusing ring 18 is biased by a slightly less negative voltage potential by source 22 through lead 23.

The electron multiplier and readout section 13 comprises a low velocity electron scanning beam 24 generated by a reading gun assembly 25 of well known construction suitably biased by voltage supply 26. The beam 24 scans the reverse side of target member 15 and deposits electrons in the areas corresponding to the positively charged or initially brighter areas of the electron image. The returning beam of electrons 27 will contact the anode electrode member of the reading gun to be scattered, deflected and collected by a plurality of multiplying dynode electrodes 28 which include a collecting electrode for coupling the correlated output signals by means of lead 29 to the external load. The returning beam signal modulation or readout signal is utilized in the cross correlation of signals in accordance with the system of the present invention. This signal represents the difference between uniform currents from the reading beam 24 and the current abstracted by the charging process to provide a negative electron image relative to the optical image impinging on the photocathode.

A conductive coating or other suitable metallic structure 30 is disposed within the envelope 11 and is coupled to the high accelerating anode voltage used in the reading gun supplied by the voltage source 26. An external alignment coil 31 of well known construction is used to align the beam initially. A deflecting coil 32 as well as a focusing magnetic coil 33 are similarly externally disposed and through biasing in a conventional manner utilizing sawtooth voltage generators, the focusing and scanning functions with appropriate frequencies and variable voltages are supplied.

In the aforereferenced patent applications biasing of the target mesh electrode of the image orthicon device 10 by voltage supply 34 is at a suitable potential so that the storage target member potential defined by the reading gun beam is at the intermediate crossover operation mode. In this operating mode the stable modulation characteristic which can produce both positive and negative charging of the target member may be realized. Application of the electrical correlation input signal from source 35 to the biased target mesh electrode however creates serious problems in the image orthicon device. Conventionally, the target mesh electrode 19 is spaced substantially closer to the storage target member 15 than the nearest adjacent electrode 30 on the reverse side. Illustratively, the spacing is in the order of about 0.002 inch between the target mesh and the target member while the electrode 30 is disposed in the order of about 50 times this spacing. As a result a large discreptancy in the capacitances arises between the respective electrodes within the image orthicon device. The correlation input signals applied to the target mesh electrode are in effect applied across two capacitances in series. Consequently, the signal due to the large discrepancies in capacitances on opposing sides divides in inverse ratio with the result that very little signal will appear between the target member and target mesh electrode. The considerable loss of input correlation signal effect in modulation of the electric field between the target mesh electrode and storage target member than has hindered attempts to apply the modulation signals to the target mesh electrode in a conventional image orthicon device.

The difficulties enumerated are obviated in accordance with the teachings of the present invention by the provision of balancing or about equal capacitances on opposing sides of the storage target member. An additional planar conductive mesh electrode 36 is disposed adjacent to and parallel with the storage target member 15 on the reading gun 25 side. This electrode which is referred to as the rear target mesh electrode may be substantially the same distance from the target member as mesh electrode 19 and have the same mesh permeability to electrons. Electrode 36 is biased by voltage supply 49 at a slight positive potential in view of the disposition on the reading gun side of the device. While the target mesh electrode bias has been indicated as slightly negative, materials will vary from tube to tube to result in a varying value to provide a target cutoff voltage. A range in the order of about three volts negative to one volt positive may be indicated with final vernier adjustments being made in the voltages initially during the balancing operation. The operation of the device 10 with the new and novel electrode arrangement and application of a correlation input signal to the target mesh electrode results in substantially one-half of the input signal modulating potential appearing between the target member 15 and mesh electrode 19.

Figure 2:
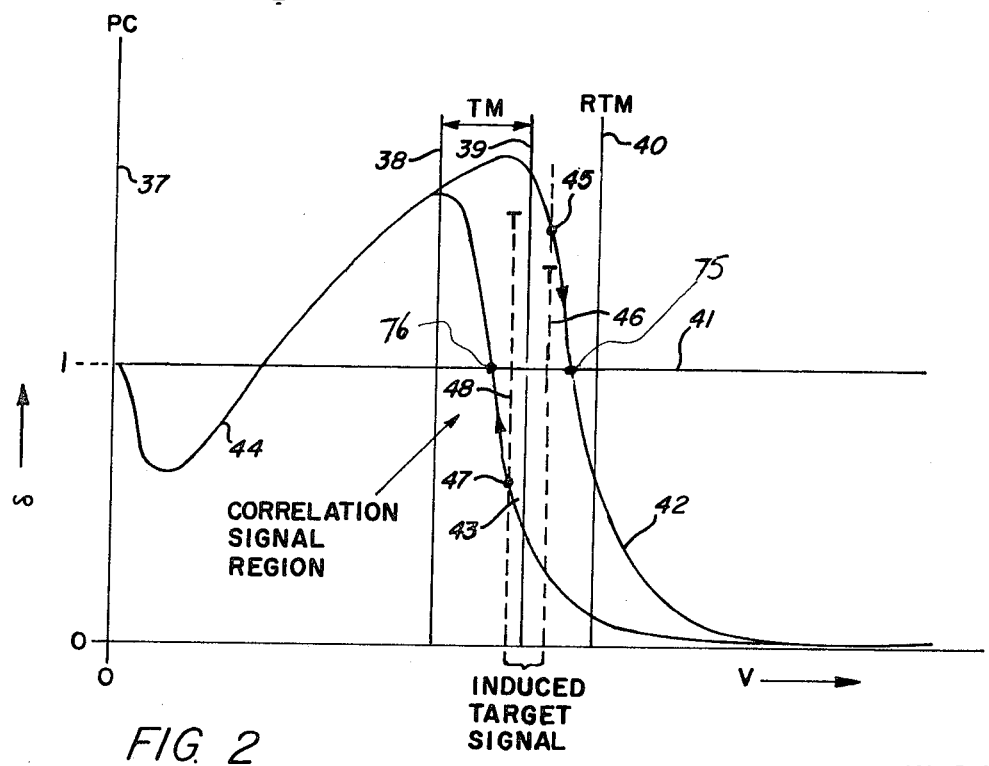
FIG. 2 is a graph illustrating the voltage versus secondary electron emission characteristics for the operation mode of the embodiment of the present invention.

The performance characteristics in the operation mode illustrated in FIG. 1 will now be described in the graph shown in FIG. 2. The desirable characteristics in the intermediate crossover region of operation for an insulated target member include an increase in target potential decreasing the secondary electron emission ratio below unity thereby producing a negative charging effect driving the target potential in a negative direction followed by return of the target potential to the crossover point again. Conversely, a decrease in target potential increases the secondary electron emission ratio above unity causing a positive charging effect on the target and returning its potential back to the crossover point. In the illustration the secondary electron emission ratio $\delta$ and voltage characteristics V of the storage target member are plotted along the vertical and horizontal, respectively. The solid vertical line 37 and symbol PC indicates the potential of the photocathode surface. Further to the right are lines 38 and 39 which indicate the potential change produced by the signal applied to the target mesh. Line 40 indicates the potential of the rear target mesh which remains constant. The horizontal line 41 indicates a value for the secondary electron emission ratio of unity.

Operation of the configuration shown with signals of positive or negative modulation potential impressed on the biased target mesh electrode results in curve 42 for positive signals and curve 43 for the negative modulation signals. The initial region between the photocathode and the target mesh member is shown by the curve 44 and indicates the secondary electron emission characteristics in this region. A positive signal indicates on curve 42 and point 45 on dotted line 46 a positive charge on the storage target member. It will be noted that the target member charge comes to equilibrium again where the curve 42 falls to unity at point 75.

In the reverse manner, a negative signal indicates on curve 43 and dotted line 48 and point 47 for a negative storage target potential with the return to the equilibrium state again being attained at point 76. The target charging mechanism, therefore, is stable and tends to follow the modulation signals impressed on the target mesh electrode through the provision of the additional rear target mesh member for balancing of the capacitances.

Figure 3:
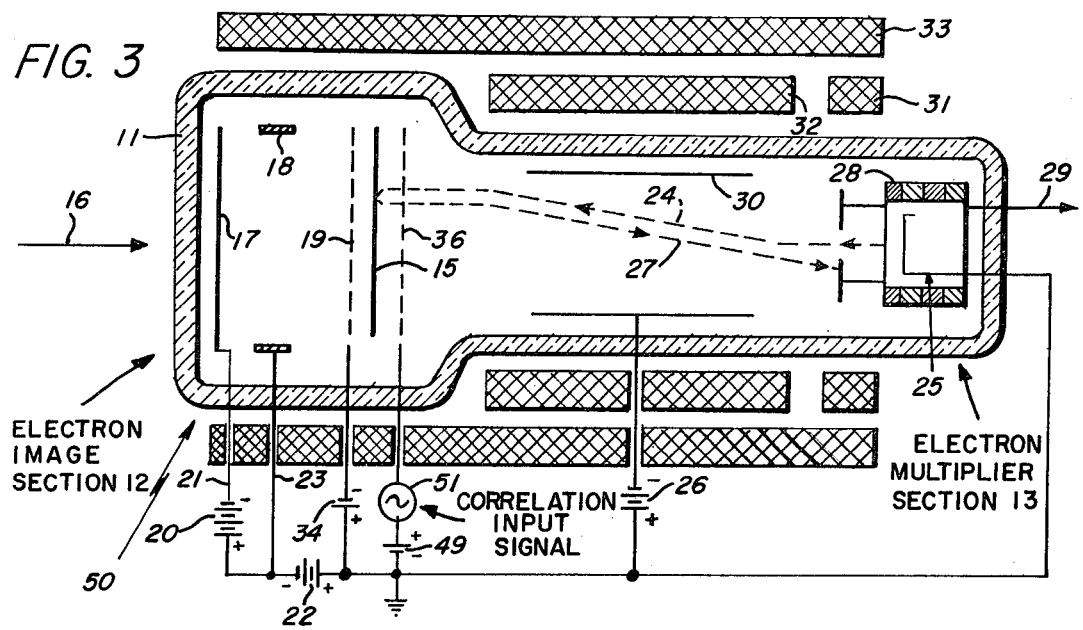
FIG. 3 is a schematic diagram of an alternative embodiment of the invention.

Referring to FIG. 3 wherein similar structure has been similarly numbered an image orthicon device 50 representing an alternative embodiment of the invention is illustrated. In this configuration the rear target mesh electrode 36 is again biased at a slightly positive voltage by means of supply 49. The electrical input correlation signal from a source 51 is applied to the electrode member which will result in the target potential being modulated by induction to substantially one-half of the input signal voltage swing. The target mesh potential in this embodiment remains substantially fixed and since the electron path from the target mesh electrode to the target is substantially less than the total electron path length from the photocathode this operating mode is essentially free of focus disturbance. The additional condition required in this operation mode is that the reading gum be turned off during the application of the input correlation signal; however, this is a normal condition for correlator operation.

Figure 4:
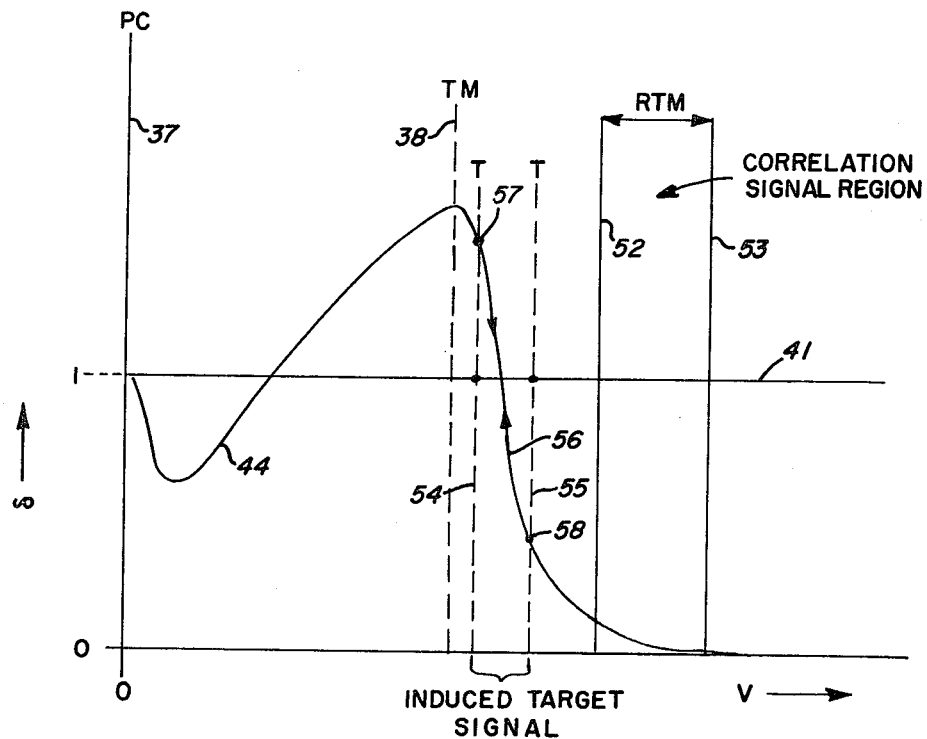
FIG. 4 is a graph illustrating the voltage versus secondary electron emission characteristics for the operation mode of the alternative embodiment shown in FIG. 3.

In FIG. 4 it will be noted that the $\delta$ versus V characteristic remains fixed and the application of the input signal voltage in the region denoted by the solid lines 52 and 53 to the rear target mesh induces a target signal indicated within the range between the dotted lines 54 and 55. The single curve 56 indicates both the positive and negative target charging by the induced signal. Point 57 intersecting dotted line 54 represents the positive charge and point 58 will indicate the negative charge. It will therefore be evident that the induced charge which is essentially one-half of the voltage swing designated in the region between lines 52 and 53 will effectively modulate the target member through the provision of substantially equally spaced mesh members on opposing sides of the target member to balance the capacitances. The target member potential may thus be effectively modulated in a positive and negative direction coinciding with the correlation signal information assimilated with other input information in a system which will now be described.

Figure 5:
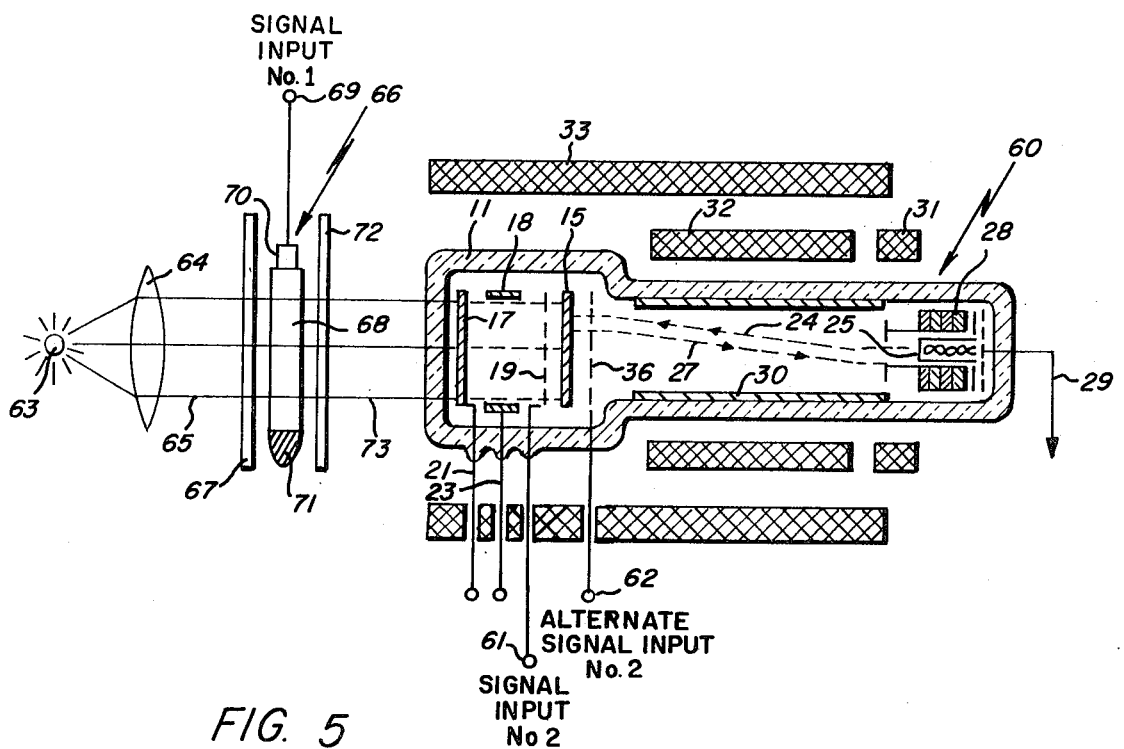
FIG. 5 is a schematic diagram of an electrooptical correlator system utilizing the embodiment of the invention.

FIG. 5 illustrates an electrooptical correlation system incorporating an image orthicon device of the rear target mesh configuration designated generally 60. The device may be coupled to an external input signal fed to either terminals 61 or 62 connected to target mesh electrode 19 or rear target mesh electrode 36, respectively, as has been hereinbefore described in reference to FIGS. 1 and 3. Radiant energy emanating from a source 63 is directed by means of lens 64 to form a collimated beam of rays 65 directed toward an optical delay line modulator 66. The radiant energy beam is focused first through a light polarizer 67 upon a solid state birefringent optical delay line 68, preferably of a material such as fused quartz capable of supporting elastic waves upon stimulation by electric input signals applied to terminal 69. The delay line element 68 comprises an input transducer 70 of the piezoelectric type coupled through terminal 69 to the external modulation source. The opposing end of the optical delay line 68 is terminated in a sonic energy absorber 71 to prevent the generation of undesirable reflections of the traversing accoustic energy.

A second light responsive means follows the optical delay line 68 and comprises a light polarizer 72. The emergent modulated light beam 73 impinges upon the photosensitive cathode 17 within the envelope 11 of the image orthicon tube 60. The impinging energy results in the emission of photoelectrons and the previously described secondary electron emission phenomena within the electron image section which together with the following reading gun section provides by electrical converting and translating means the multiplication, integration and correlation functions required in such systems.

A unique correlator tube for use in an electrooptical correlation system of the image orthicon type has thus been described wherein a modulation signal applied to either the target mesh electrode or an additional electrode disposed on the rear side of the target member modulates the target potential in the preferred manner to achieve a correlation function. While specific details of the illustrative embodiment have been shown and described herein it is intended that this description be considered as exemplary only without limiting in any way the interpretation of the broadest aspects of the invention as defined in the appended claims.

I claim:

1. An image orthicon electron discharge device comprising:
   an evacuated envelope;
   means defining an electron image section disposed adjacent to one end of said envelope;
   said electron image section including a photocathode having a photosensitized surface for converting incident radiant energy rays into photoelectrons disposed at one end;
   a charge storage target member disposed at the opposing end of said section and having a surface coating of a material with a secondary electron emission ratio greater than unity;
   means for generating an electron scanning beam directed to the reverse side of said target member disposed adjacent to the opposing end of said envelope;
   a first conductive mesh member disposed adjacent to and parallel with the photocathode side of said target member;
   a second conductive mesh member disposed adjacent to and parallel with the electron scanning beam side of said target member;
   the spacing between each of said mesh members and the adjacent target member surface being substantially equal;
   means for electrically biasing said first and second mesh members at predetermined potentials relative to said target member;
   and means for coupling an input electrical modulation signal from an external source of said first mesh member superimposed upon said biasing potential to control by induction the characteristics of the charge stored on said target member.

2. An image orthicon electron discharge device comprising:
   an evacuated envelope;
   means defining an electron image section disposed adjacent to one end of said envelope;
   said electron image section including a photocathode having a photosensitized surface for converting incident radiant energy rays into photoelectrons disposed at one end;
   a charge storage target member disposed at the opposing end of said section and having a surface coating of a material with a secondary electron emission ratio greater than unity;
   means for generating an electron scanning beam directed to the reverse side of said target member disposed adjacent to the opposing end of said envelope;
   a first conductive mesh member disposed adjacent to and parallel with the photocathode side of said target member;
   a second conductive mesh member disposed adjacent to and parallel with the electron scanning beam side of said target member;
   the spacing between each of said mesh members and the adjacent target member surface being substantially equal;
   means for electrically biasing said first and second mesh members at predetermined potentials relative to said target member;
   and means for coupling an input electrical modulation signal from an external source to said second mesh member superimposed upon said biasing potential to control by induction the characteristics of the charge stored on said target member.

3. An electrooptical correlator tube comprising:
   an evacuated envelope;
   a photocathode having a photosensitized surface for emitting photoelectrons upon incidence of radiant energy signals disposed adjacent to one end of said envelope;
   a charge storage target member disposed at an intermediate point of said envelope and having a surface coating of a material with a secondary electron emission ratio greater than unity;
   means for generating an electron scanning beam directed to the reverse side of said target member to vary the potential of the charge stored thereon in accordance with the intensity pattern of the incident energy signals;
   first and second target mesh members disposed at substantially equal distances adjacent to opposing sides of said target member and providing substantially equal capacitances relative to adjacent surfaces;
   means for electrically biasing said mesh members at predetermined potentials relative to said target member;
   means coupling an input electrical modulation signal from an external source to said target mesh member disposed adjacent to said photocathode side of said target member superimposed upon said biasing potential to induce a variation of the charge stored on said target member;
   and means coupled to said scanning beam means to collect and transmit an electrical output signal.

4. An electrooptical correlator tube comprising:
   an evacuated envelope;
   a photocathode having a photosensitized surface for emitting photoelectrons upon incidence of radiant energy signals disposed adjacent to one end of said envelope;
   a charge storage target member disposed at an intermediate point of said envelope and having a surface coating of material with a secondary electron emission ratio greater than unity;
   means for generating an electron scanning beam directed to the reverse side of said target member to vary the potential of the charge stored thereon in accordance with the intensity pattern of the incident energy signals;
   first and second target mesh members disposed at substantially equal distances adjacent to opposing sides of said target member and providing substantially equal capacitances relative to adjacent surfaces;
   means for electrically biasing said mesh members at pre-determined potentials relative to said target member;
   means coupling an input electrical modulation signal from an external source to said target mesh member disposed adjacent to said scanning beam side of said target member superimposed upon said biasing potential to induce variation of the charge store on said target member;

means for de-energizing said scanning beam means during the time of application of said modulation signal;

and means coupled to said scanning beam means to collect and transmit an electrical output signal.

5. An electrooptical correlation system comprising:

a source of radiant energy signals;

means for collimating and directing said signals in a beam to traverse an optical delay line modulator;

said modulator including means or introducing a first electrical correlation input signal to ultrasonically modulate the emergent beam signal pattern;

photoelectric conversion means for detecting and integrating said emergent beam signals comprising:

an evacuated envelope;

a photocathode at one end of said envelope adapted to emit photoelectrons;

a charge storage target member spaced from said photocathode and having a surface coating of a material having a secondary electron emission ratio greater than unity;

means for electronically scanning the reverse side of said target member, collecting and transmitting a readout correlated electrical output signal;

first and second conductive target mesh members disposed adjacent to and parallel with opposing sides of said target member at substantially equal distances;

and means for electrically biasing said mesh members at predetermined potentials relative to said target member.

6. A system according to claim 5 and means for coupling a second electrical correlation input signal from an external source to said mesh member disposed adjacent to the photocathode side of said target member to modulate by induction the charge stored on said target member.

7. A system according to claim 5 and means for coupling a second electrical correlation input signal from an external source to said mesh member disposed adjacent to the scanning side of said target member to modulate by induction the charge stored on said target member.

* * * * *

UNITED STATES PATENT OFFICE
CERTIFICATE OF CORRECTION

Patent No. 3,796,908            Dated March 12, 1974

Inventor(s) Rudolf C. Hergenrother

It is certified that error appears in the above-identified patent and that said Letters Patent are hereby corrected as shown below:

In the Specification

Column 1, lines 10-11 delet "The single pattern with the remaining signals being suppressed."

Column 1, line 33 change "result" to --resultant--

Column 2, line 64, change "of", second occurrence read -- on --.

In the Claims

Column 7, line 40, change "of" to --to--.

Signed and sealed this 15th day of October 1974.

(SEAL)
Attest:

McCOY M. GIBSON JR.            C. MARSHALL DANN
Attesting Officer               Commissioner of Patents